US006549292B1

(12) United States Patent
Schmidt et al.

(10) Patent No.: US 6,549,292 B1
(45) Date of Patent: Apr. 15, 2003

(54) METHOD AND APPARATUS FOR INSPECTING HOLLOW TRANSPARENT ARTICLES

(75) Inventors: William E. Schmidt, Gibsonia, PA (US); Mark F. Zanella, Sr., Chicora, PA (US)

(73) Assignee: AGR International, Inc., Butler, PA (US)

( * ) Notice: Subject to any disclaimer, the term of this patent is extended or adjusted under 35 U.S.C. 154(b) by 0 days.

(21) Appl. No.: 09/690,235

(22) Filed: Oct. 17, 2000

(51) Int. Cl.[7] .............................................. G01B 11/06
(52) U.S. Cl. ....................................... 356/630; 356/632
(58) Field of Search .................................. 356/630, 631, 356/632, 635, 639, 625, 240.1; 250/223 B, 559.19, 559.27, 559.28

(56) References Cited

U.S. PATENT DOCUMENTS

| | | | | |
|---|---|---|---|---|
| 2,998,745 | A | * 9/1961 | McClellan | |
| 3,307,446 | A | * 3/1967 | Rottmann | |
| 4,822,171 | A | 4/1989 | Brand et al. | |
| 4,859,861 | A | * 8/1989 | Mersch | 356/382 |
| 4,902,902 | A | 2/1990 | Tole | |
| 4,973,343 | A | * 11/1990 | Frazee, Jr. et al. | 356/73.1 |
| 5,289,265 | A | * 2/1994 | Inoue et al. | 356/382 |
| 5,291,271 | A | 3/1994 | Juvinall et al. | |
| 5,636,027 | A | 6/1997 | Spengler et al. | |
| 6,285,451 | B1 | * 9/2001 | Herron | 356/382 |

FOREIGN PATENT DOCUMENTS

| EP | 0 871 007 A1 | 10/1998 |
|---|---|---|

* cited by examiner

Primary Examiner—Hoa Q. Pham
(74) Attorney, Agent, or Firm—Arnold B. Silverman; Eckert Seamans Cherin & Mellot, LLC

(57) ABSTRACT

A method of determining a physical characteristic of a hollow transparent article includes positioning the article at an inspection station, creating a scanning light beam which is split into two inspection light beams which are caused to impinge on different portions of the article. A plurality of sensors receive light reflected from the external and internal surfaces of the wall of the article and convert the same into corresponding electrical signals. The electrical signals are based upon the elapsed time from the initiation of the light beam or scanning light beam until arrival of a reflected light beam at least two sensors. The transparent article may, for example, be a container or tube. The inspection light beams are preferably caused to impinge on the article from opposed directions with each impinging on the article within about 70° degrees and preferably about 60° degrees of a radial plane perpendicular to the article. The method may be employed to determine wall thickness of the hollow article and/or shape thereof. The processor, which may be any suitably programmed microprocessor, effects comparison between the electrical signals received from the opto-electrical sensors and stored information with time of arrival of reflected light beams from the object facilitating the processor's determination regarding wall thickness or shape. The invention also provides apparatus for inspecting hollow transparent articles which includes a light source, a scanner for creating a scanning light beam, a beam splitter to convert the light beam into two inspection beams which are caused to impinge on two different portions of the container and a plurality of sensors which receive reflected light beams from the container and emit responsive electrical signals to a processor. The processor receives a time initiation signal from a first sensor and time of receipt of reflected signals from at least two additional sensors.

58 Claims, 5 Drawing Sheets

METHOD AND APPARATUS FOR INSPECTING HOLLOW TRANSPARENT ARTICLES

BACKGROUND OF THE INVENTION

1. Field of the Invention

The present invention is directed toward an optical method and associated apparatus for determining a physical property of a hollow transparent article and, more specifically, it is directed toward such a method and system for determining the characteristic, such as wall thickness and shape, by means of multiple inspection light beams which are received by multiple detectors and processed to ascertain the desired information.

2. Description of the Prior Art

It has been known to employ optical non-contacting means to inspect hollow transparent articles by passing a light beam through the article having the light beam received by optical-electrical sensor means which convert the received light into a corresponding electrical signal which is processed by a suitable computer to compare the received signals with stored information. See, for example, U.S. Pat. No. 5,291,271.

U.S. Pat. No. 4,822,171 discloses a method and apparatus of measuring wall thickness of a transparent container wherein a scanning beam and imaging lens are employed. The system does not have the capability of determining whether the interior and exterior wall surfaces are parallel or the shape of the container. It employs vertical orientation and a single receiver.

U.S. Pat. No. 4,902,902 discloses apparatus for determining thickness of a material such as a glass plate. It employs a single beam and line-scan camera in combination with imaging lens. It not only requires the presence of an imaging lens, but also lacks the ability to make a determination of whether the wall surfaces are parallel and to make a shape determination.

U.S. Pat. No. 5,291,271 discloses a system employing a single beam, a line-scan camera in combination with an imaging lens. Laser light is employed along with container rotation.

U.S. Pat. No. 5,636,027 discloses a dual beam system having a dual line-scan camera with imaging lenses. As a result of the presence of only two receivers, it lacks the ability for determining shapes such as radii and also as a result of the required use of an imaging lens, it has positional limitations.

European Patent Application EP 0 871 007 A1 discloses a single beam and line-scan camera in combination with imaging lenses. While it discloses means for measuring container diameter, it lacks the ability to distinguish between various shapes, such as an elliptical shape and flat spot, for example.

In spite of the foregoing disclosures, there remains a very real and substantial need for an improved type of system for inspecting transparent hollow articles wherein wall thickness, parallel relationship between interior and exterior surfaces of the wall and shape may be automatically and effectively determined.

SUMMARY OF THE INVENTION

The present invention has met the hereinbefore described needs.

The method of the present invention determines a physical characteristic of a hollow transparent article by positioning the article at an inspection station, creating a scanning light beam, splitting the scanning light beam into two inspection light beams and causing the two inspection light beams to impinge on different portions of the article. A plurality of sensors are employed to receive the light reflected from the external and internal surfaces of the wall of the article and convert the same into electrical signals which are delivered to a suitable processor. The processor may be a microprocessor programmed in a manner well known to those skilled in the art. A sensor also provides initiation of a timing cycle. The times of arrival on the reflected light beams are compared by the processor from sensor to sensor and are employed in making a determination as to whether the interior surfaces are parallel to the exterior surfaces, whether the article has a particular shape and such things as wall thickness.

The method does not require the use of an imaging lens intermediate the article and the sensors. Preferred parameters regarding the inspection light beam regions of impingement, the times of arrival of the plurality of sensors and other characteristics of the information being sought are provided.

The apparatus of the present invention includes a light source, which may be a laser, for emitting a light beam which is delivered to a scanner which creates a scanning light beam which in turn by a beam splitter is converted into a pair of inspection light beams. The inspection light beams are caused to impinge on the article being inspected from generally opposed directions with a plurality of sensors receiving reflected light beams from the article being inspected and converting the same into responsive electrical signals which are emitted to the processor for determination based upon time of arrival of the reflected light beams at respective sensors to make various determinations regarding thickness and shape of the article being inspected.

It is an object of the present invention to provide an accurate, rapid, multi-beam method of inspecting hollow transparent articles to determine characteristics such as wall thickness and shape.

It is a further object of the present invention to provide such a system wherein a plurality of sensors receive reflected beams and permits a processor, based upon relative timing of receipt of the same, to make such determinations through comparisons.

It is yet another object of the present invention to provide such a system which is suitable for inspecting transparent glass or plastic containers.

It is a further object of the present invention to provide such a system which does not require the use of positional limiting imaging lenses.

It is a further object of the present invention to provide such a system which is adapted to determine radii and wall thickness of transparent containers.

These and other objects of the invention will be more fully understood from the following detailed description of the invention on reference to the illustrations appended hereto.

DESCRIPTION OF THE PREFERRED EMBODIMENTS

As employed herein, reference to "transparent hollow article" shall refer to hollow articles including containers and tubes which have adequate transparency to permit the light transmission needed for the invention to function and shall expressly include tinted articles which meet these characteristics. It shall also include articles that are sufficiently transparent to either the visible or infrared spectrum. It also shall embrace articles made of glass and/or plastic.

Figure 1:
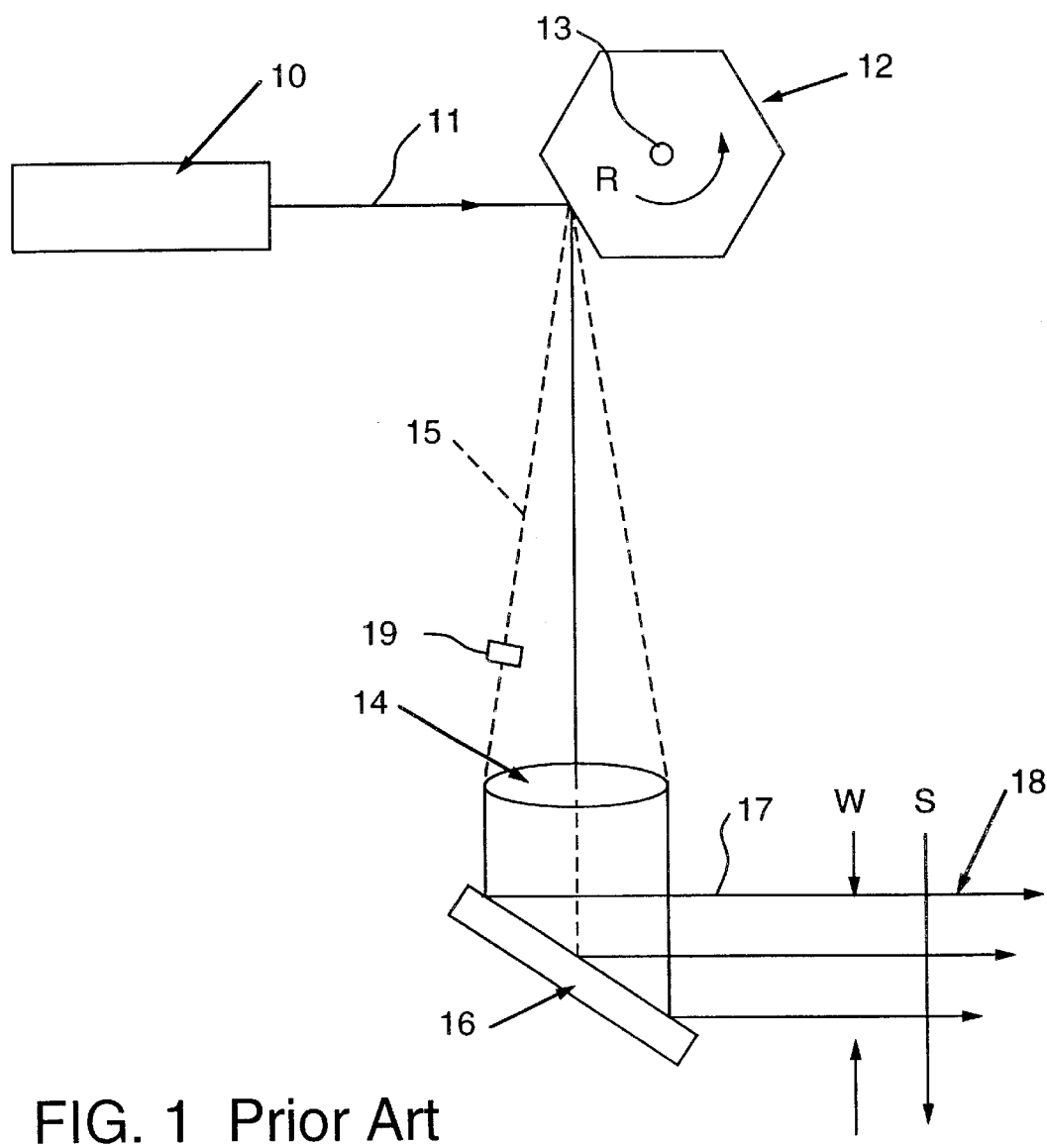
FIG. 1 illustrates schematically a prior art system showing a single scanning light beam employed to cause a scanning beam to impinge upon an object which is being inspected.

Referring to FIG. 1, there is shown a light source 10 which may be a laser directing a light beam 11 to rotatable beam deflection apparatus 12 which is designed to rotate about axis 13 in the direction shown by arrow R. In the form illustrated, it may be a polygonal mirror scanner. The emerging light beam 15 passes through beam forming optics or lens 14 and impinges on mirror 16 which causes the redirected beam 18 to move generally to the right of FIG. 1. The direction of scanning of the beam 18 as it emerges from mirror 16 is indicated by the arrow S and the width of the scanning beam W is shown. This prior art system produces parallel rays of small beam diameter at the surface of the object being evaluated (not shown). FIG. 1 also shows a sensor 19 which is adapted to receive a portion of beam 15 to detect the beginning of a scanning cycle. It will be noted that it is positioned at such a location as to pick up the first beam 17 that will emerge from mirror 16.

Figure 2:
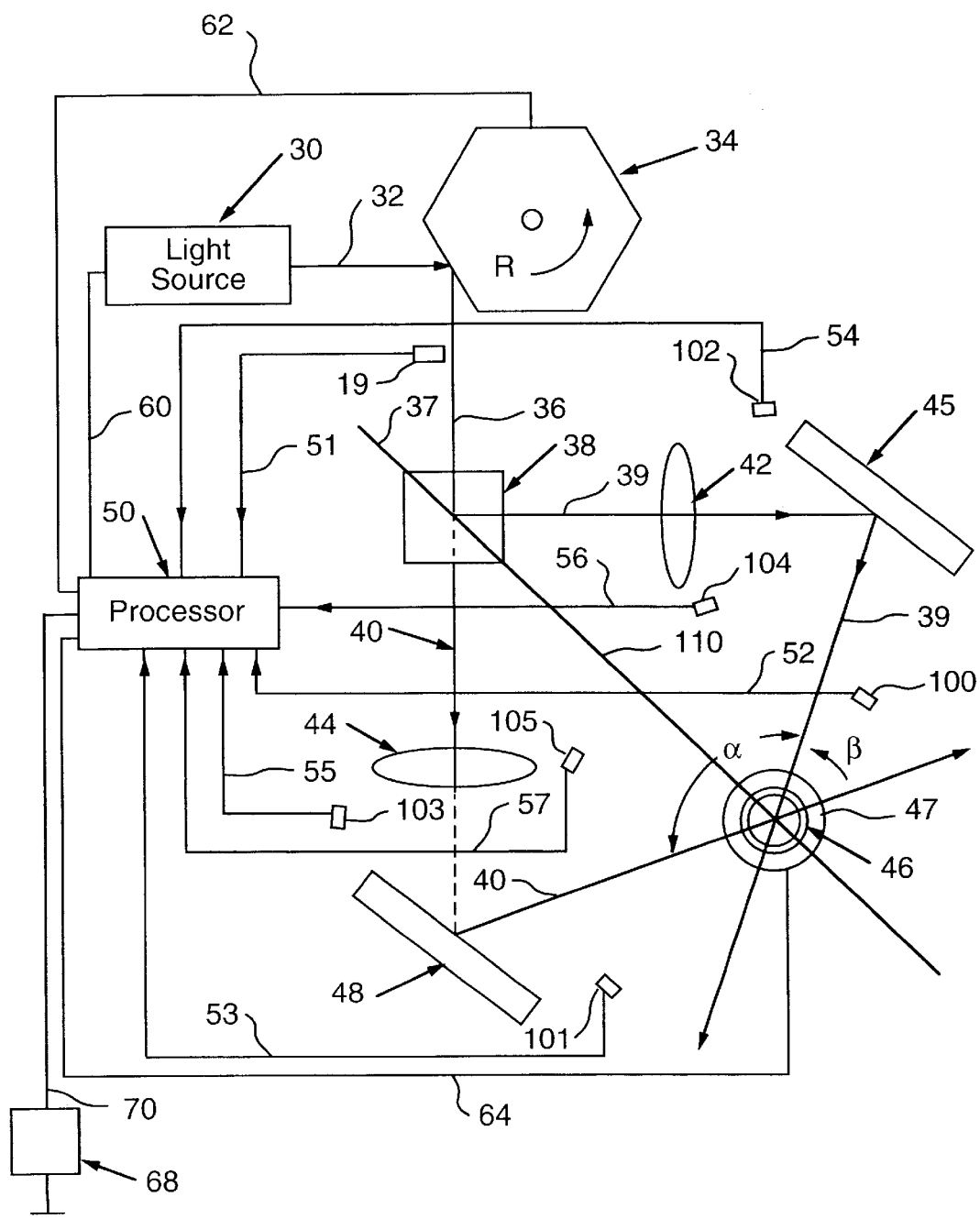
FIG. 2 is a schematic illustration of a scanning beam, two inspection beam system of the present invention employed to inspect articles.

Referring to FIG. 2, a schematic illustration of the present invention will be considered.

In this embodiment, a light source 30, which may be a laser, emits a light beam 32 which impinges upon rotatable beam deflector 34 which in turn emits beam 36 which is the scanning light beam. The scanning light beam 36 enters the beam splitting member 38 which may be a beam splitting cube. The beam splitting cube 38 splits the scanning beam 36 into a first inspection light beam 39 and a second inspection light beam 40 which are passed respectively through beam forming optics or lenses 42, 44 and impinge respectively on mirrors 45, 48 which redirect the inspection light beams 39, 40 to article 46 which, in the form shown, is a round container. Container 46, in the form shown, is mounted on rotatable pedestal 47 which may be driven and controlled in a manner well known by those skilled in the art, for example, in the direction indicated by arrow β.

Light is reflected off the article 46 and is received by a plurality of sensors 100, 101, 102, 103, 104, 105 which are spread about the region adjacent to the article 46. The details of the impinging inspection light beams 39, 40 and the reflected light beams will be discussed in greater detail below.

As also shown in FIG. 2, a processor 50 receives from sensors 19, 100, 101, 102, 103, 104, and 105 via, respectively, leads 51, 52, 53, 54, 55, 56, 57 input from the respective sensors. As will be described in greater detail hereinafter, the processor 50 which will be programmed in a manner known to those skilled in the art will receive a signal from sensor 19 to indicate the start of the scanning cycle and will time the receipt of reflected light beams emerging from the article 46 and compare it with stored information so as to determine by way of the relative timing of receipt of said reflected light beams by, the sensors 100, 101, 102, 103, 104, and 105 to permit determination of certain physical characteristics of the article. For example, wall thickness, whether the article is round or non-round, whether the interior and exterior surfaces of an article wall are parallel, as well as certain size and shape determinations may be effected. The processor 50 will also control operation of the light source 30 through lead 60, the beam deflection apparatus 34 through lead 62 and the operation of the object rotating element 47 through lead 64. In addition, the processor 50 may operate a reject or selection mechanism 68, such as those well kknown to those skilled in the art through lead 70.

It will generally be preferred to have one light inspection beam 39, 40 impinge upon the article to be inspected from a generally opposite direction than the other inspection light beam 39, 40. In this context, reference to "opposite" does not necessarily mean diametrically opposite, but rather means that the incident light emerging from one beam 39, 40 will move in a different direction from the incident light from the other beam 39, 40. It is preferred that the included angle α between the two inspection light beams 39, 40 as they impinge on the article 46 be about 80° to 140° degrees.

Figure 3:
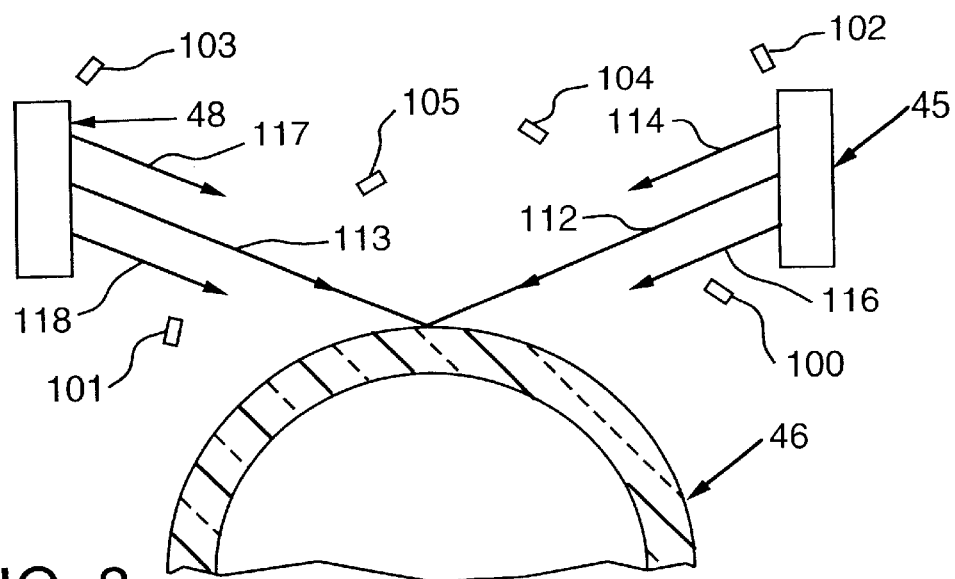
FIG. 3 is a schematic illustration of opposed light beams and a plurality of sensors employed in inspecting an article of the present invention.

Considering a radial plane perpendicular to the object, such as plane 37 which is perpendicular to the article 46 and referring to FIG. 3 in greater detail, it will be seen that mirrors 45, 48 cause scanned inspection light beam 112, 113, respectively, to impinge from opposed directions about 70° degrees therefrom and preferably about 60° degrees therefrom upon the hollow transparent article 46 which may be considered to be a glass container, for example.

The scanned beam is illustrated in such a manner that a prior beam is representative of inspection light beam 112 is designated 114 and a subsequent one 116. Similarly, a prior portion of inspection light beam 113 is indicated as 117 and a subsequent one as 118.

It will be seen that the plurality of sensors 100, 101, 102, 103, 104, 105 are scattered in various directions so that they each received a reflected light beam from only one inspection light beam 39, 40.

Figure 4:
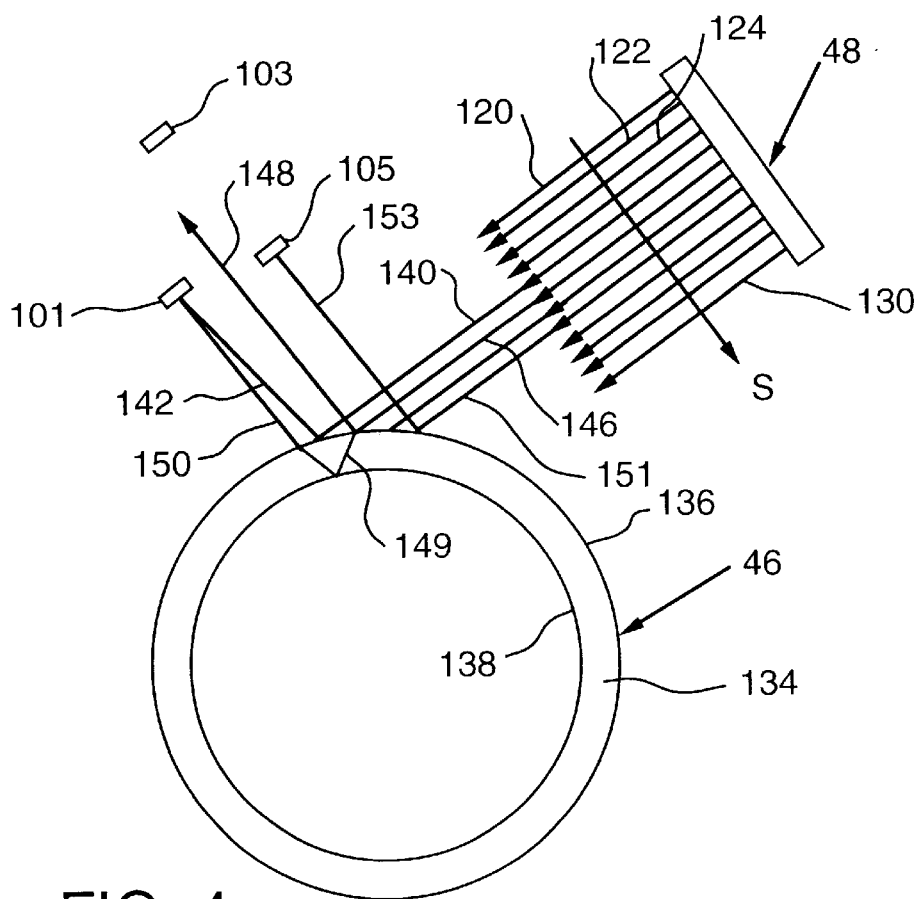
FIG. 4 is a schematic illustration showing details of one of the inspection light beams being scanned on an article and reflected light beam.

Referring to FIG. 4 and focusing in greater detail on inspection light beam 40, it is seen that mirror 48 sequentially directs the plurality of emerging beams 120, 122, 124 and so on up through 130 onto the container 46 which has a wall 134 having an outer surface 136 and an inner surface 138. In the form shown, it is seen that light beam 140 which is one of the scanned inspection light beams impinges on the outer surface 136 and emits a reflected light beam 142 which is received by sensor 101 at a specific time. Light beam 146 also impinges on the outer surface 136, but emits a reflected light beam 148 which does not impinge on any of the sensors 100–105. A portion 149 of light beam 40 refracts to the interior surface 138 and emits a reflected light beam 150 which impinges on sensor 101. Light beam 151 reflects off outer surface 136 and has light beam 153 impinge on sensor 105. In this manner, as the inspection light beam 40 is scanned, a plurality of time differentiated reflected light signals will be provided with some of them impinging on sensors.

The sensors of the present invention may be any known photo=electrical sensors which are adapted to accurately and rapidly convert received light into responsive corresponding electrical signals. The sensors may be about 50–100 micrometers thick and have a height of about 15–25 mm. Among the suitable detectors are photodiodes, silicon detectors, and PSD'S. It is preferred that cameras not be used.

It will be appreciated that the present invention does not require the use of image forming lenses intermediate the container 46 and the sensors 100–105. This provides the advantage of being able to inspect a rotating container with large lateral motion.

Figure 5:
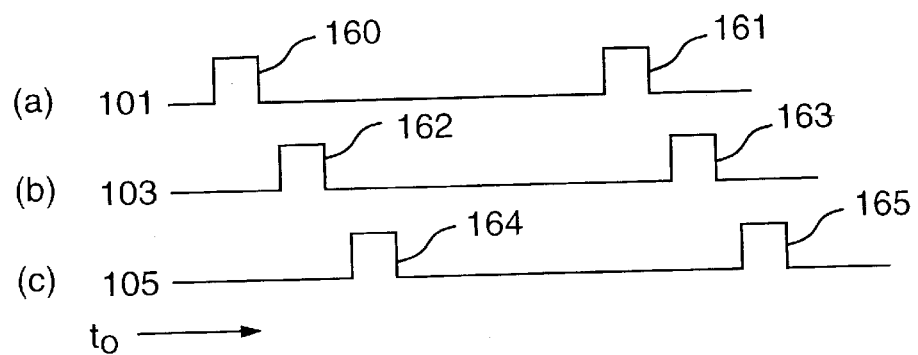
FIGS. 5(a)–5(c) is a plot of pulse trains representative of electrical signals emitted by each of three sensors over a period of time.
Figure 6:
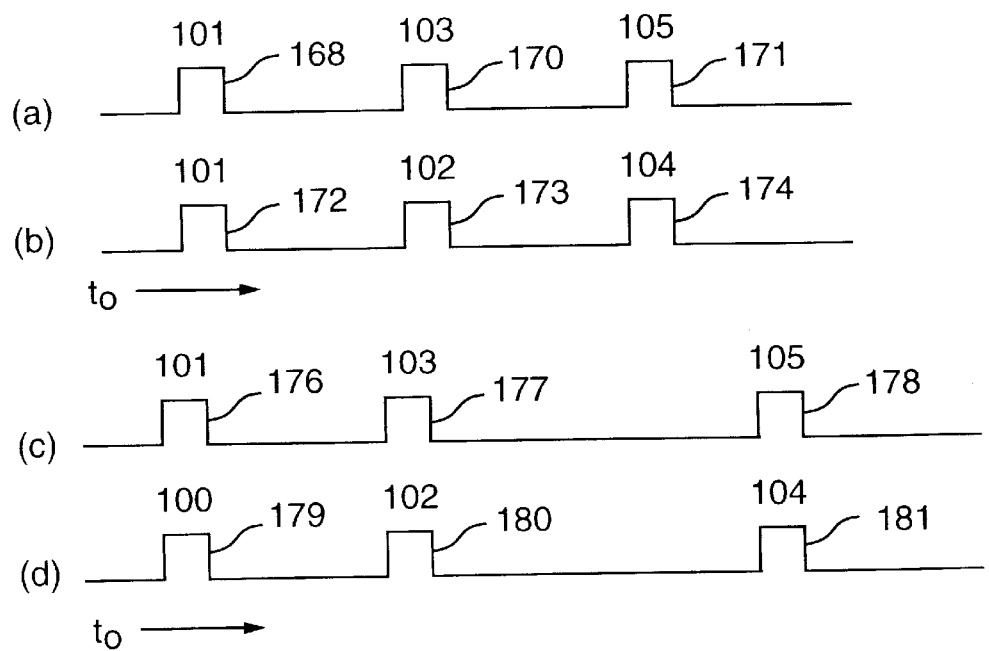
FIGS. 6(a)–6(d) represent time-related plots of the relative relationship of a set of reflected light beams by three sensors per plot.
Figure 7:
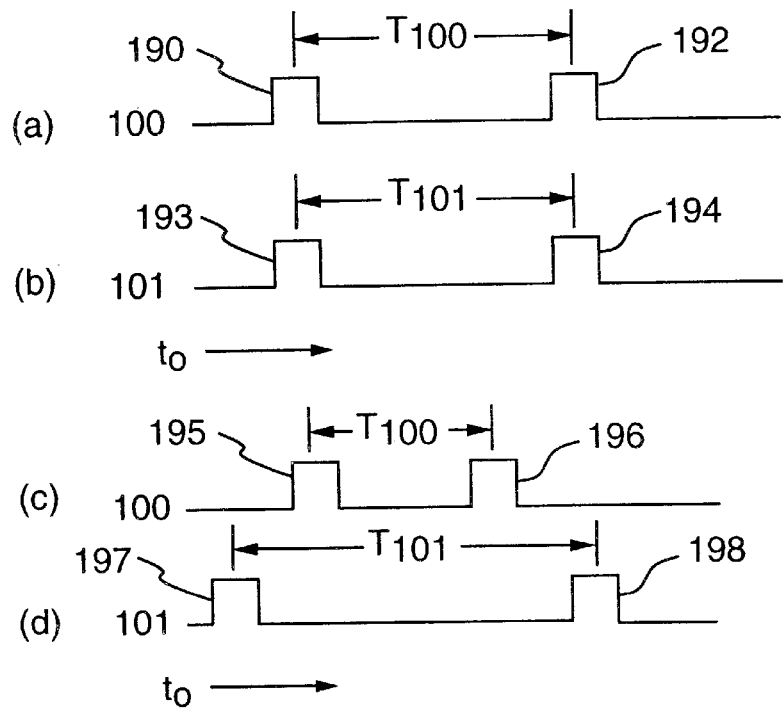
FIGS. 7(a)–(d) show time related plots of individual sensors as compared for purposes of determining whether the inner and outer surfaces of the article wall are parallel.

For convenience of disclosure, FIGS. 5 and 7 illustrate reflected light beams from both the outside and inside surfaces of the article being inspected, while FIG. 6 illustrates reflections solely from the outside surface.

Referring to FIG. 5, with reference to three plots of individual sensors 101, 103, 105, which are shown as receiving light solely from the scanned inspection light beam 39. The legend $t_0$ indicates the start of the cycle with the scanning light beam being emitted as indicated by sensor 19 (FIG. 2). As shown in FIGS. 5, 6, and 7, the time relationship to the response received by the sensors 100–105 enables the determination of physical characteristics of the article 46, such as wall thickness, shape, radius and size, for example. Referring to FIG. 5(a), it is seen that at two distinct times after $t_0$, sensor 101 received a reflected light beam as shown by the representation of signals 160, 161. By comparison, sensor 103 received reflected light beams at 162 and 163, which were later in time than sensor 101, but generally of equal magnitude and with the same interval between received reflected light beams as sensor 101. Similarly, sensor 105 received reflected light beams shown by signals 164, 165, which also were received later in time, but with the same time interval between signals 164 and 165. The electrical signals delivered to the processor 50 enable the processor 50 to determine certain physical characteristics of the article 46 being inspected on the basis of these time variations among the plurality of sensors.

Referring to FIG. 6(a), it will be seen that the spacing between signals 168 and 170, representative of the time interval between sensor 101 and sensor 103 receiving reflected light beams from the outside surface 136 (FIG. 4) is equal to the time interval between signals 170 and 171 received by detectors 103 and 105. Similarly, as shown in FIG. 6(b), the timing of receipt of signals 172, 173 and between 173 and 174, respectively, received by sensors 101 and 102, and sensors 102 and 104, are equal, thereby indicating that the article being inspected, such as a container, is of round configuration. The closer the next adjacent signals on a given plot, the smaller the radius of the article.

By contrast, with reference to FIG. 6(c), it is seen that the original time interval of receipt of reflected light beams, as shown by signals 176, 177, is of a shorter duration than the time interval between receipt of signal 177 by sensor 103 and signal 178 of sensor 105. This indicates a flat spot or a departure from a circular configuration of the portion of the container inspected. As the spacing between 176 and 177 is equal to the spacing between 168 and 170, while the spacing between 170 and 171 on the one hand, and 177 and 178 on the other, is different, this would tend to indicate a round configuration which, in the case of FIG. 6(c), has a local flat spot. Also, with respect to FIG. 6(d), it is noted that reflected beams generating signal 179, 180 between detectors 100 and 102 has the same spacing as the spacing between signals 172 and 173 in FIG. 6(b), but has a different spacing between signals 180 and 181 as compared with the spacing between sensor signals 102 and 104 in FIG. 6(b). This also indicates the presence of a local flat zone.

Referring now to FIG. 7 in greater detail, it will be seen that once one has established through the described means a determination of the outer surface parameters, one can investigate the inner surface and, therefore, determine optically by non-contacting means, the container wall thickness and whether the inner container wall surface is parallel to the outer container wall surface. Referring to FIGS. 7(a) and (b), it is seen that in respect of sensors 100 and 101 which, as shown in FIG. 2, impinge in opposite positions with respect to the article 46, the elapsed time $T_{100}$ between signals 190 and 192 of sensor 100 and time $T_{101}$ of signals 193 and 194 of sensor 101 are identical. As $T_{100} = T_{101}$, this confirms that the inner and outer surfaces of the walls are parallel.

By contrast, looking at the example shown in FIGS. 7(c) and (d), it is seen that as to sensor 100, the signals 195, 196 are spaced by a time $T_{100}$ which is smaller than the time spacing $T_{101}$ between signals 197, 108 and, therefore, $T_{101}$ does not equal $T_{100}$, thereby indicating that the inner wall surface is not parallel to the outer wall surface in the portion inspected.

It will be appreciated, therefore, that when the wall surfaces are not parallel, the relationship between opposing sensors becomes unequal. The absolute magnitude of the time between signals is such that the greater the thickness of the wall, the larger the time displacement.

In FIGS. 5–7, specific sensors have been employed by way of example. It will be appreciated that the use of a plurality of sensors in the present invention may include some inherent redundancy by using more than the minimum number of sensors needed to accomplish the inspection in order to provide a more reliable system. In general, it is preferred to employ at least three sensors.

If desired, one or more additional systems identical to that described herein may be employed to inspect the article at different heights. In such a system, an additional light source, a beam scanning mechanism, a beam splitter, and a component for causing the inspection light beams to impinge on the container would be provided, as well as a separate plurality of sensors for each system. In this manner, multiple inspections at different heights of the object may be effected simultaneously.

Figure 8:
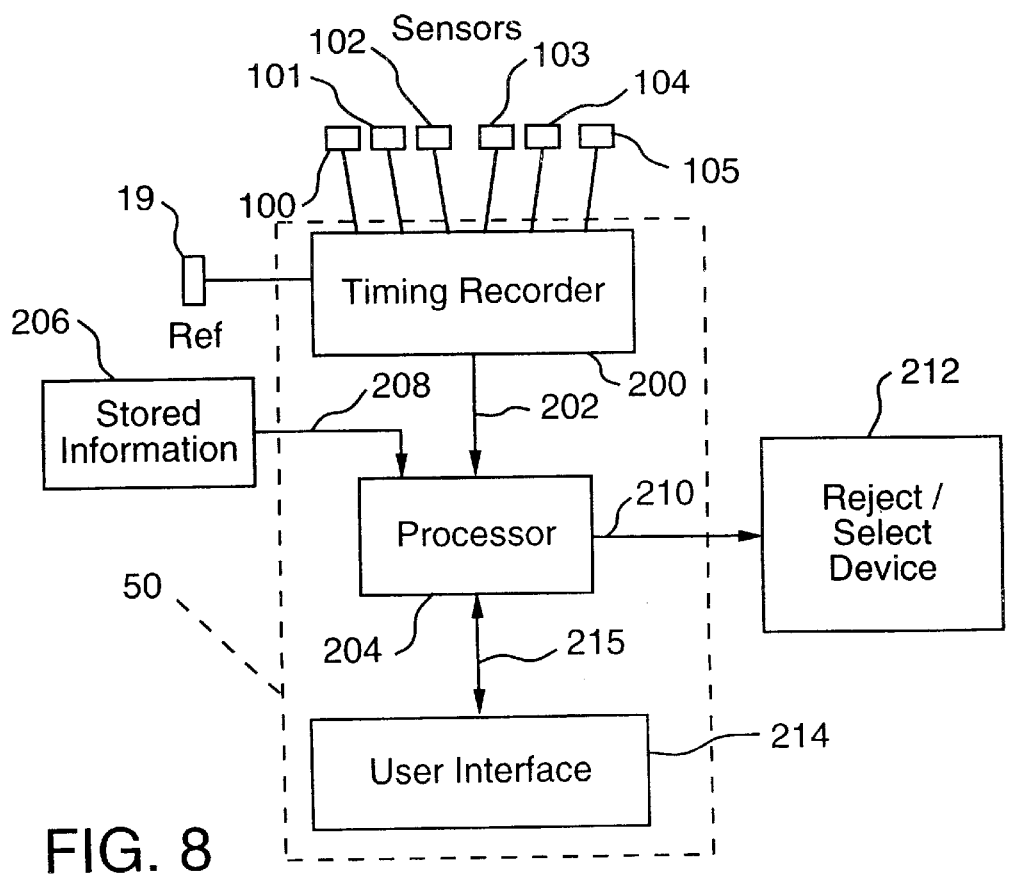
FIG. 8 is a schematic illustration showing the interrelationship between the plurality of sensors and the processor of the present invention.

Referring to FIG. 8, a preferred embodiment of the invention will be considered. A plurality of sensors 100, 102, 103, 104, 105. These sensors provide their output to timing recorder portion 200 of the processor system 50 and deliver the same to the processor 204 for comparison through lead 202 which processor also receives stored information 206 over lead 208 regarding the characteristics being monitored. If the conclusion is that a defect causing a basis for rejection of the article exists, a signal is output from the processor 50 over lead 210 to reject mechanism 212 which may physically remove the article such as a container from the inspection station or associated conveyor. If desired, a suitable user interface 214 to provide information regarding the inspection results and to input information to the system over lead 215 may be provided.

It will be appreciated that the present invention provides an effective means of automatically inspecting a hollow transparent article, such as a container or a tube, for example, employing a scanned light beam, which is split into two inspection light beams that are caused to impinge upon the article from generally opposite directions. The reflected light from each of the inspection light beams is caused to impinge in part on detectors which convert the received light into electrical output signals which are received by a processor which on the basis of the relative timing of receipt of the reflected light beams makes a determination regarding characteristics of the article being inspected. For example, in the case of a glass or plastic container, the shape of the article as being round or not, whether the internal surface and external surface of the container wall are parallel, and the relative radius of a round container, may be ascertained.

While it will be appreciated that various scan speeds can be employed, it is currently preferred to operate the present invention at a scanning speed at least 3 kHz.

Whereas particular embodiments of the present invention have been described herein for purposes of illustration, it will be evident to those skilled in the art that numerous variations of the details may be made without departing from the invention as set forth in the appended claims.

What is claimed is:

1. A method of determining a physical characteristic of a transparent hollow article comprising
    positioning said article at an inspection station,
    creating a scanning light beam,
    splitting said scanning light beam into two inspection light beams,
    causing said two inspection light beams to impinge on said article from opposite different directions,
    employing a first plurality of sensors to receive light reflected from the external and internal surfaces of a wall of said article from a first said inspection light beam and convert the same into corresponding electrical signals,
    employing a second plurality of sensors to receive light reflected from the external and internal surfaces of a wall of said article from a second said inspection light beam and convert the same into corresponding electrical signals,
    determining the times of arrival at said first and second plurality of sensors of light reflected from said article,
    employing said times to determine said physical characteristic of said article, and
    performing said method without requiring the detection of only parallel reflected light by said sensor.
2. The method of claim 1 including
    employing a container as said transparent article.
3. The method of claim 2 including
    subjecting said container to axial rotation during said determination.
4. The method of claim 3 including
    effecting progressive inspection of said container at a particular elevation as said container rotates, axially.
5. The method of claim 4 including
    creating a plurality of said scanning light beams at different elevations to inspect said container at different elevations, and
    employing a different plurality of said sensors for each said scanning light beam.
6. The method of claim 1 including
    employing a tube as said transparent article.
7. The method of claim 1 including
    effecting said scanning by establishing relative movement between a light beam and a beam deflector.
8. The method of claim 7 including
    employing laser light as the light in said scanning light beam.
9. The method of claim 7 including
    redirecting the paths of said inspection light beams emerging from said beam deflector to cause said inspection light beams to impinge on said article.
10. The method of claim 9 including
    passing said inspection light beams through beam forming optics.
11. The method of claim 10 including
    employing mirrors to redirect:the path of said inspection light beams.
12. The method of claim 1 including
    employing a beam splitter to split said scanning light beam into said two inspection beams.
13. The method of claim 12 including
    causing said two inspection beams to impinge on said article substantially simultaneously from generally opposite directions.
14. The method of claim 1 including
    initiating said time determination when either said scanning light beam or said inspection light beam passes a time reference sensor, and
    terminating said time measurement as to each said reflected light beam when said reflected light beam arrives at a said detector.
15. The method of claim 14 including
    delivering said sensor electrical signals to a processor, and
    employing said processor to determine wall thickness of said article from said electrical signals.
16. The method of claim 1 including
    positioning a first group of said sensors to receive reflected light beams emerging from a first said inspection light beam, and
    positioning a second group of sensors to receive reflected light beams emerging from a second said inspection light beam.
17. The method of claim 1 including
    employing said method to determine wall thickness of said article.
18. The method of claim 17 including
    employing said method on a container.
19. The method of claim 18 including
    employing said method to determine if the outer and inner surfaces of a container wall are generally parallel.
20. The method of claim 1 including
    employing said method to determine shape of said article.
21. The method of claim 20 including
    employing said time measurement to determine said shape with greater frequency of reflected light beams received at a plurality of said sensors indicating a reduced radius on said article.
22. The method of claim 21 including
    determining if said electrical signals received from a pair of opposed said sensors are received at the same time intervals that said shape is round.
23. The method of claim 21 including
    determining if said electrical signals received from a pair of opposed said sensors at different time intervals that the shape is not round.

24. The method of claim 1 including
causing said two inspection light beams to impinge on said article from generally opposed directions.

25. The method of claim 24 including
causing said inspection light beams to impinge on said article at an included angle of about 80° to 140° degrees.

26. The method of claim 25 including
each said inspection light beam impinging on said article within about 60° degrees of a radial plane oriented perpendicular to said article.

27. The method of claim 1 including
performing said method without employing image forming lenses between said article and said sensors.

28. The method of claim 1 including
employing said method to determine whether the inner surface of a container wall is parallel to the outer surface thereof.

29. The method of claim 28 including
employing elapsed time between successive electrical pulses of two or more said sensors in making said determination of whether the surfaces are parallel.

30. Apparatus for inspecting a transparent hollow article comprising
a light source for emitting a light beam,
a scanner for receiving said light beam and emitting a scanning light beam,
a beam splitter for converting said scanning light beam into two inspection light beams which generally simultaneously impinge said article from generally opposite directions,
a first plurality of sensors for receiving reflected light beams from said article solely from one of said inspection light beams and emitting responsive electrical signals,
a second plurality of sensors for receiving reflected light beams from said article solely from a second of said inspection light beams and emitting responsive electrical signals, and
a processor for receiving said electrical signals and determining the time of arrival of said reflected light beams at each of said sensors and determining a physical characteristic of said article whereby said inspection is effected without requiring collimation of said reflected light.

31. The apparatus of claim 30 including
said processor being structured to determine wall thickness of said hollow article.

32. The apparatus of claim 30 including
said processor being structured to determine shape of said hollow article.

33. The apparatus of claim 32 including
said processor structured to sequentially generate information regarding the shape of said article as said scanning occurs.

34. The apparatus of claim 32 including
said processor determining from the time of arrival of reflected light beams from said article to at least two sensors whether the article is round in shape.

35. The apparatus of claim 34 including
said processor determining when said electrical signals received from a pair of opposed sensors are received at the same time intervals that the shape of the article is round.

36. The apparatus of claim 35 including
said processor means determining said round shape has a reduced radius when the frequency of electrical signals emanating from at least two compared said sensors is less than a reference standard.

37. The apparatus of 34 including
said processor determining when said electrical signals are received from a pair of opposed sensors at different time intervals that the shape of the article is not round.

38. The apparatus of claim 30 including
said processor being structured to receive information regarding the initiation time of said scanning light beam.

39. The apparatus of claim 30 including
each said inspection light beam impinging on said article within an angle with respect to a radial plane perpendicular to said article of about 70° degrees.

40. The apparatus of claim 30 including
said apparatus being structured to measure non-round articles.

41. The apparatus of claim 40 including
said apparatus being structured to measure non-round portions of said article.

42. The apparatus of claim 30 including
said processor being structured to determine if the exterior and interior surfaces of the wall of said article are parallel.

43. The apparatus of claim 30 including
a reject mechanism for removing a container if said processor issues a reject signal thereto.

44. The apparatus of claim 30 including
said apparatus having a plurality of said light scanning, and
detecting systems with each inspecting a different portion of said article.

45. The apparatus of claim 44 including
each said additional system positioned at a different elevation from the other.

46. The apparatus of claim 30 including
beam forming optics for directing each said inspection light beam onto said article.

47. The apparatus of claim 46 including
a mirror for receiving said inspection light beam from said beam forming optics and directing said inspection light to said article.

48. The apparatus of claim 30 including
said apparatus being structured to inspect a container.

49. The apparatus of claim 48 including
a container support structured to effect axial rotation of said container.

50. The apparatus of claim 30 including
said apparatus being structured to inspect a tube.

51. The apparatus of claim 30 including
said light source including a laser.

52. The apparatus of claim 30 including
said apparatus being structured to cause said inspection light beams to impinge on said article from opposed directions.

53. The apparatus of claim 52 including
said apparatus being structured to effect said impingement of said inspection light beams on said articles substantially simultaneously.

54. The apparatus of claim 30 including
at least one of said sensors being a time initiation sensor, to provide a reference for measurement of elapsed time of reflected light beams received by the other said sensors.

55. The apparatus of claim 30 including said inspection light beams being directed onto said article with an included angle therebetween of about 80° to 140° degrees.

56. The apparatus of claim 30 including said processor controlling the arrival of said two inspection light beams to effect impingement on said article substantially simultaneously.

57. The apparatus of claim 30 including beam forming optics interposed between said beam splitter and said article for directing said inspection light beams.

58. The apparatus of claim 57 including mirrors for receiving said inspection light beams from said beam forming optics and directing said intersecting light beams to said article.

* * * * *

UNITED STATES PATENT AND TRADEMARK OFFICE
CERTIFICATE OF CORRECTION

PATENT NO. : 6,549,292 B1
DATED : April 15, 2003
INVENTOR(S) : William E. Schmidt et al.

It is certified that error appears in the above-identified patent and that said Letters Patent is hereby corrected as shown below:

<u>Title page,</u>
Item [57], ABSTRACT,
Line 11, "beam at least two sensors." should read -- beam at at least two sensors. --

<u>Column 4,</u>
Line 11, "by, the sensors" should read -- by the sensors --.
Line 22, "kknown" should read -- known --.

<u>Column 5,</u>
Line 5, "photo=electrical" should read -- photo-electrical --.

<u>Column 7,</u>
Line 59, "rotates, axially." should read -- rotates axially. --.

<u>Column 8,</u>
Line 15, "redirect:the" should read -- redirect the --.

<u>Column 10,</u>
Line 64, "initiation sensor," should read -- initiation sensor --.

Signed and Sealed this

Thirtieth Day of September, 2003

JAMES E. ROGAN
*Director of the United States Patent and Trademark Office*